(12) United States Patent
Yamazaki et al.

(10) Patent No.: US 11,480,766 B2
(45) Date of Patent: Oct. 25, 2022

(54) CAMERA LENS

(71) Applicant: AAC Optics Solutions Pte. Ltd., Singapore (SG)

(72) Inventors: Kaoru Yamazaki, Osaka (JP); Hiroyuki Teraoka, Osaka (JP)

(73) Assignee: AAC Optics Solutions Pte. Ltd., Singapore (SG)

( * ) Notice: Subject to any disclaimer, the term of this patent is extended or adjusted under 35 U.S.C. 154(b) by 333 days.

(21) Appl. No.: 16/817,641

(22) Filed: Mar. 13, 2020

(65) Prior Publication Data

US 2021/0263272 A1 Aug. 26, 2021

(30) Foreign Application Priority Data

Feb. 24, 2020 (JP) .............................. JP2020-028914

(51) Int. Cl.
*G02B 13/00* (2006.01)
*G02B 9/62* (2006.01)

(52) U.S. Cl.
CPC ........... *G02B 13/0045* (2013.01); *G02B 9/62* (2013.01)

(58) Field of Classification Search
CPC ... G02B 3/04; G02B 9/64; G02B 9/62; G02B 13/001; G02B 13/18; G02B 13/06; G02B 13/0055; G02B 13/0015; G02B 13/0045
USPC ....... 359/766, 750, 751, 754, 713, 756, 757, 359/759
See application file for complete search history.

(56) References Cited

U.S. PATENT DOCUMENTS

| 2013/0120858 | A1* | 5/2013 | Sano | ................. G02B 9/62 359/713 |
| 2013/0235473 | A1* | 9/2013 | Chen | ................. G02B 13/0045 359/713 |
| 2016/0018629 | A1* | 1/2016 | Tang | ................. G02B 13/0045 359/713 |

* cited by examiner

*Primary Examiner* — Travis S Fissel
(74) *Attorney, Agent, or Firm* — W&G Law Group

(57) ABSTRACT

The present invention provides a camera lens consisting of six lenses and having a small height, a wide angle, and good optical properties. The camera lens includes, from an object side, a first lens having a positive refractive power, a second lens having a negative refractive power, a third lens having a positive refractive power, a fourth lens having a negative refractive power, a fifth lens having a positive refractive power, and a sixth lens having a negative refractive power. The camera lens satisfies specific conditions.

2 Claims, 10 Drawing Sheets

CAMERA LENS

TECHNICAL FIELD

The present invention relates to a camera lens, and particularly, to a camera lens, which consists of six lenses, is suitable for portable module cameras that adopt high-pixel Charge Coupled Device (CCD), Complementary Metal-Oxide Semiconductor Sensor (CMOS), or other imaging elements, and has a small height of TTL (a total optical length)/IH (an image height)<1.30, a wide angle (i.e., a full field of view, hereinafter referred to as 2ω) above 80° and good optical properties.

BACKGROUND

In recent years, various imaging devices using imaging elements such as CCDs and CMOSs are widely applied. With the development of miniaturization and high performance of these imaging elements, it is urgent to develop a camera lens with a small height, a wide angle, and good optical properties.

The technologies in terms of the camera lens consisting of six lenses and having a small height, a wide angle, and good optical properties are driven to be developed. As a camera lens having a structure of six lenses, a camera lens is provided to include a first lens having a positive refractive power, a second lens having a negative refractive power, a third lens having a positive refractive power, a fourth lens having a negative refractive power, a fifth lens having a positive refractive power, and a sixth lens having a negative refractive power that are sequentially arranged from an object side.

Regarding the camera lens disclosed in the prior art, a distortion of a maximum image height, a refractive power distribution of the second lens, as well as a ratio of an on-axis distance from an image side of the fifth lens to an object side of the sixth lens to a focal length of the entire lens system are insufficient, so that the height reduction and the wide angle are insufficient.

SUMMARY

A purpose of the present invention is to provide a camera lens consisting of six lenses and having a small height, a wide angle, and good optical properties.

For the above purpose, the applicant has intensively studied a distortion of a maximum image height, a refractive power distribution of a second lens, an on-axis distance from an image side of a fifth lens to an object side of a sixth lens, as well as a ratio of a center thickness of the sixth lens to a focal length of the entire lens system, and has obtained a camera lens of the present invention which can solve the technical problems in the related art.

A camera lens according to a first technical solution includes, from an object side, a first lens having a positive refractive power, a second lens having a negative refractive power, a third lens having a positive refractive power, a fourth lens having a negative refractive power, a fifth lens having a positive refractive power, and a sixth lens having a negative refractive power. The camera lens satisfies following conditions:

$5.00 \leq DMI \leq 15.00;$ $-5.50 \leq f2/f \leq -3.50;$ $0.18 \leq d10/f \leq 0.30;$ and $0.09 \leq d11/f \leq 0.15,$ where DMI denotes a distortion of a maximum image height;

f denotes a focal length of the camera lens;

f2 denotes a focal length of the second lens;

d10 denotes an on-axis distance from an image side surface of the fifth lens to an object side surface of the sixth lens; and d11 denotes a center thickness of the sixth lens.

The camera lens according to a second technical solution further satisfies a following condition:

$4.00 \leq R3/R4 \leq 25.00,$ where R3 denotes a curvature radius of an object side surface of the second lens; and R4 denotes a curvature radius of an image side surface of the second lens.

The camera lens according to a third technical solution further satisfies a following condition:

$15.00 \leq v1-v3 \leq 45.00,$ where v1 denotes an abbe number of the first lens; and v3 denotes an abbe number of the third lens.

Technical Effects

According to the present invention, particularly provided is a camera lens, which consists of six lenses, is suitable for portable module cameras that adopt high-pixel CCD, CMOS, or other imaging elements, has a small height of TTL (total optical length)/IH (image height)<1.30, guarantees a wide angle of 2ω>80°, and also has good optical properties.

DESCRIPTION OF EMBODIMENTS

Figure 1:
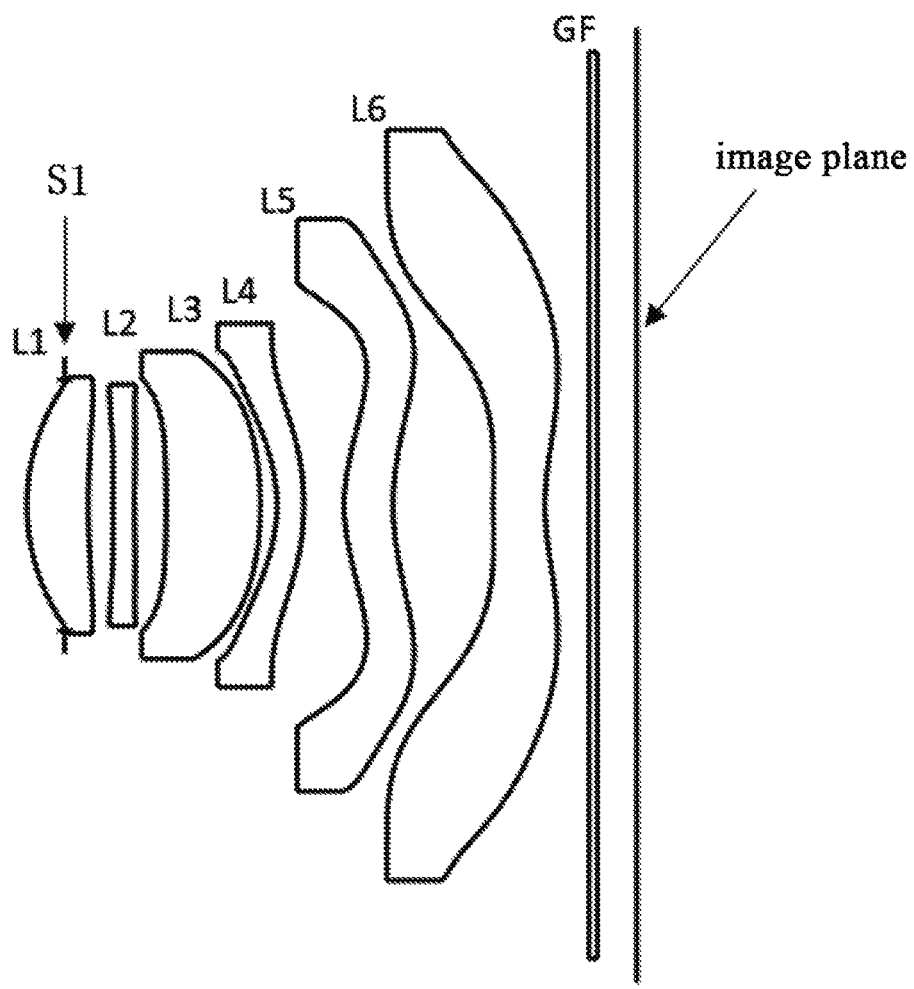
FIG. 1 is a schematic diagram of a camera lens LA according to a first embodiment of the present invention.

The embodiments of the camera lens according to the present invention will be described below. The camera lens LA is provided with a lens system. The lens system is a six-lens structure and includes a first lens L1, a second lens L2, a third lens L3, a fourth lens L4, a fifth lens L5, and a sixth lens L6 that are arranged from an object side to an image side. A glass plate GF is arranged between the sixth lens L6 and an image plane. A cover glass plate and various filters can be considered as the glass flat plate GF. In the present invention, the glass plate GF may be arranged at different positions, or may also be omitted.

The first lens L1 is a lens having a positive refractive power, the second lens L2 is a lens having a negative refractive power, the third lens L3 is a lens having a positive refractive power, the fourth lens L4 is a lens having a negative refractive power, the fifth lens L5 is a lens having a positive refractive power, and the sixth lens L6 is a lens having a negative refractive power. In order to correct various aberrations, it is desirable to design all surfaces of these six lenses as aspherical surfaces.

The camera lens LA satisfies the following conditions (1) to (4):

$$5.00 \leq DMI \leq 15.00 \quad (1);$$

$$-5.50 \leq f2/f \leq -3.50 \quad (2);$$

$$0.18 \leq d10/f \leq 0.30 \quad (3); \text{ and}$$

$$0.09 \leq d11/f \leq 0.15 \quad (4),$$

where DMI denotes a distortion of a maximum image height;
 f denotes a focal length of the camera lens;
 f2 denotes a focal length of the second lens;
 d10 denotes an on-axis distance from an image side surface of the fifth lens to an object side surface of the sixth lens; and
 d11 denotes a center thickness of the sixth lens.

The condition (1) specifies the distortion of the maximum image height. If it is outside the range of condition (1), a correction of on-axis and off-axis aberrations becomes difficult due to wide-angle and low-height, which is not preferable.

The condition (2) specifies the negative refractive power of the second lens L2. If it is outside the range of condition (2), a correction of on-axis and off-axis aberrations becomes difficult due to wide-angle and low-height, which is not preferable.

The condition (3) specifies a ratio of the on-axis distance from the image side surface of the fifth lens to the object side surface of the sixth lens to the focal length of the camera lens. If it is outside the range of condition (3), a correction of on-axis and off-axis aberrations becomes difficult due to wide-angle and low-height, which is not preferable.

The condition (4) specifies a ratio of the center thickness of the sixth lens to the focal length of the camera lens. If it satisfies the condition (4), the thickness of the lens can be limited within appropriate range, and the lens can be formed easily. If it is outside the range of condition (4), a correction of on-axis and off-axis aberrations becomes difficult due to wide-angle and low-height, which is not preferable.

The second lens L2 has the negative refractive power, and satisfies the following condition (5):

$$4.00 \leq R3/R4 \leq 25.00 \quad (5),$$

where R3 denotes a curvature radius of an object side surface of the second lens; and
R4 denotes a curvature radius of an image side surface of the second lens.

The condition (5) specifies a ratio of the curvature radius R3 of the object side surface of the second lens to the curvature radius R4 of the image side surface of the second lens. If it satisfies the condition (5), aberrations can be corrected, while an occurrence of coma caused by manufacturing errors can be suppressed; or if it is within the range of condition (5), with the wide-angle and low-height, on-axis and off-axis aberrations can be easily corrected, which is preferable.

A difference between an abbe number of the first lens L1 and an abbe number of the third lens L3 satisfies the following condition (6):

$$15.00 \leq v1-v3 \leq 45.00 \quad (6),$$

where v1 is the abbe number of the first lens; and
v3 is the abbe number of the third lens.

The condition (6) specifies the difference between the abbe number of the first lens L1 and the abbe number of the third lens L3. If it is within the range of condition (6), with the wide-angle and low-height, on-axis and off-axis aberrations can be easily corrected, which is preferable.

The six lenses of the camera lens LA satisfy the above construction and conditions, so as to obtain the camera lens consisting of six lenses and having a small height of TTL (a total optical length)/IH (an image height) <1.30, 2ω>80°, and good optical properties.

Embodiments

The camera lens LA of the present invention will be described with reference to the embodiments below. The reference signs described in the embodiments are listed below.

In addition, the distance, radius and center thickness are all in a unit of mm.
 f: focal length of the camera lens LA;
 f1: focal length of the first lens L1;
 f2: focal length of the second lens L2;
 f3: focal length of the third lens L3;
 f4: focal length of the fourth lens L4;
 f5: focal length of the fifth lens L5;
 f6: focal length of the sixth lens L6;
 Fno: F number;
 2ω: full field of view;
 DMI: distortion of maximum image height;
 S1: aperture;
 R: curvature radius of an optical surface, a central curvature radius for a lens;
 R1: curvature radius of an object side surface of the first lens L1;
 R2: curvature radius of an image side surface of the first lens L1;
 R3: curvature radius of an object side surface of the second lens L2;
 R4: curvature radius of an image side surface of the second lens L2;
 R5: curvature radius of an object side surface of the third lens L3;
 R6: curvature radius of an image side surface of the third lens L3;
 R7: curvature radius of an object side surface of the fourth lens L4;
 R8: curvature radius of an image side surface of the fourth lens L4;
 R9: curvature radius of an object side surface of the fifth lens L5;

R10: curvature radius of an image side surface of the fifth lens L5;

R11: curvature radius of an object side surface of the sixth lens L6;

R12: curvature radius of an image side surface of the sixth lens L6;

R13: curvature radius of an object side surface of the glass plate GF;

R14: curvature radius of an image side surface of the glass plate GF;

d: center thickness or distance between lenses;

d0: on-axis distance from the aperture S1 to the object side surface of the first lens L1;

d1: center thickness of the first lens L1;

d2: on-axis distance from the image side surface of the first lens L1 to the object side surface of the second lens L2;

d3: center thickness of the second lens L2;

d4: on-axis distance from the image side surface of the second lens L2 to the object side surface of the third lens L3;

d5: center thickness of the third lens L3;

d6: on-axis distance from the image side surface of the third lens L3 to the object side surface of the fourth lens L4;

d7: center thickness of the fourth lens L4;

d8: on-axis distance from the image side surface of the fourth lens L4 to the object side surface of the fifth lens L5;

d9: center thickness of the fifth lens L5;

d10: on-axis distance from the image side surface of the fifth lens L5 to the object side surface of the sixth lens L6;

d11: center thickness of the sixth lens L6;

d12: on-axis distance from the image side surface of the sixth lens L6 to the object side surface of the glass plate GF;

d13: center thickness of the glass plate GF;

d14: on-axis distance from the image side surface of the glass plate GF to the image plane;

nd: refractive index of d line;

nd1: refractive index of d line of the first lens L1;

nd2: refractive index of d line of the second lens L2;

nd3: refractive index of d line of the third lens L3;

nd4: refractive index of d line of the fourth lens L4;

nd5: refractive index of d line of the fifth lens L5;

nd6: refractive index of d line of the sixth lens L6;

ndg: refractive index of d line of the glass plate GF;

v: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

vg: abbe number of the glass plate GF;

TTL: total optical length (on-axis distance from the object side surface of the first lens L1 to the image plane); and LB: on-axis distance from the image side surface of the sixth lens L6 to the image plane (including the thickness of the glass plate GF).

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \quad (7)$$

For convenience, the aspheric surface of each lens surface uses the aspheric surface defined in the equation (7). However, the present invention is not limited to the aspherical polynomial defined in the equation (7).

First Embodiment

FIG. 1 is a schematic diagram of a camera lens LA according to a first embodiment of the present invention. The curvature radiuses R of the image side surfaces and object side surfaces of the first lens L1 to the sixth lens L6 of the camera lens LA according to the first embodiment, the center thicknesses of the lenses, or distances d between the lenses, refractive indexes nd, abbe numbers v are shown in Table 1; conic coefficients k and aspheric coefficients are shown in Table 2; and 2ω, Fno, f, f1, f2, f3, f4, f5, f6, TTL, and IH are shown in Table 3.

TABLE 1

|  | R |  | d | nd |  | vd | Effective radius(mm) |
|---|---|---|---|---|---|---|---|
| S1 | ∞ | d0= | −0.478 |  |  |  | 1.592 |
| R1 | 2.70200 | d1= | 0.778 | nd1 | 1.5267 | v1 | 76.60 | 1.629 |
| R2 | 10.92677 | d2= | 0.313 |  |  |  | 1.570 |
| R3 | 137.95965 | d3= | 0.270 | nd2 | 1.6153 | v2 | 25.94 | 1.529 |
| R4 | 17.24707 | d4= | 0.399 |  |  |  | 1.531 |
| R5 | −27.50813 | d5= | 1.191 | nd3 | 1.5661 | v3 | 37.71 | 1.598 |
| R6 | −4.35213 | d6= | 0.209 |  |  |  | 1.947 |
| R7 | −2.12037 | d7= | 0.340 | nd4 | 1.6700 | v4 | 19.39 | 1.979 |
| R8 | −3.47970 | d8= | 0.510 |  |  |  | 2.304 |
| R9 | 2.19633 | d9= | 0.620 | nd5 | 1.5346 | v5 | 55.69 | 2.814 |
| R10 | 3.10503 | d10= | 1.264 |  |  |  | 3.626 |
| R11 | 13.27857 | d11= | 0.653 | nd6 | 1.5348 | v6 | 55.69 | 4.283 |
| R12 | 2.79645 | d12= | 0.557 |  |  |  | 4.757 |
| R13 | ∞ | d13= | 0.110 | ndg | 1.5168 | vg | 64.17 | 6.255 |
| R14 | ∞ | d14= | 0.500 |  |  |  | 6.255 |

Reference wavelength = 588 nm

TABLE 2

| | Conic coefficient | Aspherical coefficient | | | |
|---|---|---|---|---|---|
| | k | A4 | A6 | A8 | A10 |
| R1 | 3.3456E−02 | −1.1477E−03 | 4.0143E−03 | −6.1014E−03 | 5.5371E−03 |
| R2 | 0.0000E+00 | −9.7195E−03 | 2.3109E−03 | −2.1071E−03 | 2.0615E−03 |

TABLE 2-continued

| | | | | |
|---|---|---|---|---|
| R3 | 0.0000E+00 | −3.8155E−02 | 1.5895E−02 | −1.6154E−03 | 1.2215E−04 |
| R4 | 0.0000E+00 | −3.7592E−02 | 1.6202E−02 | −2.3833E−03 | 1.0476E−03 |
| R5 | 0.0000E+00 | −2.3304E−02 | −1.8027E−02 | 4.3452E−02 | −7.2228E−02 |
| R6 | 0.0000E+00 | −5.7191E−03 | −2.8934E−02 | 4.7560E−02 | −5.4304E−02 |
| R7 | −2.0588E+00 | −7.1848E−03 | 2.5989E−02 | −2.2308E−02 | 9.4030E−03 |
| R8 | −5.2752E+00 | −6.0590E−02 | 7.0812E−02 | −5.2635E−02 | 2.8670E−02 |
| R9 | −2.5634E+00 | −7.1922E−02 | 4.5395E−02 | −2.5471E−02 | 9.4336E−03 |
| R10 | −1.0050E+01 | −5.1014E−03 | 3.7880E−03 | −3.8672E−03 | 1.3422E−03 |
| R11 | 3.3145E+00 | −8.6425E−02 | 2.8078E−02 | −7.2053E−03 | 1.2430E−03 |
| R12 | −1.1259E+01 | −3.6706E−02 | 1.0398E−02 | −2.2052E−03 | 3.0420E−04 |

| | Aspherical coefficient | | | | |
|---|---|---|---|---|---|
| | A12 | A14 | A16 | A18 | A20 |
| R1 | −2.9000E−03 | 8.0243E−04 | −9.6897E−05 | 0.0000E+00 | 0.0000E+00 |
| R2 | −1.4098E−03 | 4.4500E−04 | −5.7841E−05 | 0.0000E+00 | 0.0000E+00 |
| R3 | −6.3398E−04 | 3.8536E−04 | −5.9936E−05 | 0.0000E+00 | 0.0000E+00 |
| R4 | −1.2685E−03 | 6.0762E−04 | −8.8216E−05 | 0.0000E+00 | 0.0000E+00 |
| R5 | 7.2284E−02 | −4.4878E−02 | 1.6725E−02 | −3.4129E−03 | 2.9137E−04 |
| R6 | 3.7497E−02 | −1.5669E−02 | 3.9041E−03 | −5.3817E−04 | 3.1249E−05 |
| R7 | −1.0121E−03 | −5.0683E−04 | 1.6229E−04 | −1.1444E−05 | −6.2405E−07 |
| R8 | −1.0559E−02 | 2.5437E−03 | −3.8360E−04 | 3.2705E−05 | −1.1958E−06 |
| R9 | −2.3829E−03 | 4.0345E−04 | −4.3690E−05 | 2.7170E−06 | −7.3008E−08 |
| R10 | −2.6358E−04 | 3.1618E−05 | −2.2657E−06 | 8.8769E−08 | −1.4634E−09 |
| R11 | −1.3413E−04 | 9.0041E−06 | −3.6750E−07 | 8.3833E−09 | −8.2244E−11 |
| R12 | −2.6752E−05 | 1.4983E−06 | −5.2163E−08 | 1.0364E−08 | −9.0157E−12 |

TABLE 3

| | |
|---|---|
| 2ω (°) | 84.15 |
| Fno | 2.00 |
| f (mm) | 6.369 |
| f1 (mm) | 6.600 |
| f2 (mm) | −32.064 |
| f3 (mm) | 8.966 |
| f4 (mm) | −9.004 |
| f5 (mm) | 11.343 |
| f6 (mm) | −6.774 |
| TTL (mm) | 7.715 |
| LB (mm) | 1.004 |
| IH (mm) | 6.050 |

The following Table 16 shows the corresponding values of the parameters defined in the conditions (1) to (6) of the first to fifth embodiments.

As shown in Table 16, the first embodiment satisfies the conditions (1) to (6).

Figure 2:
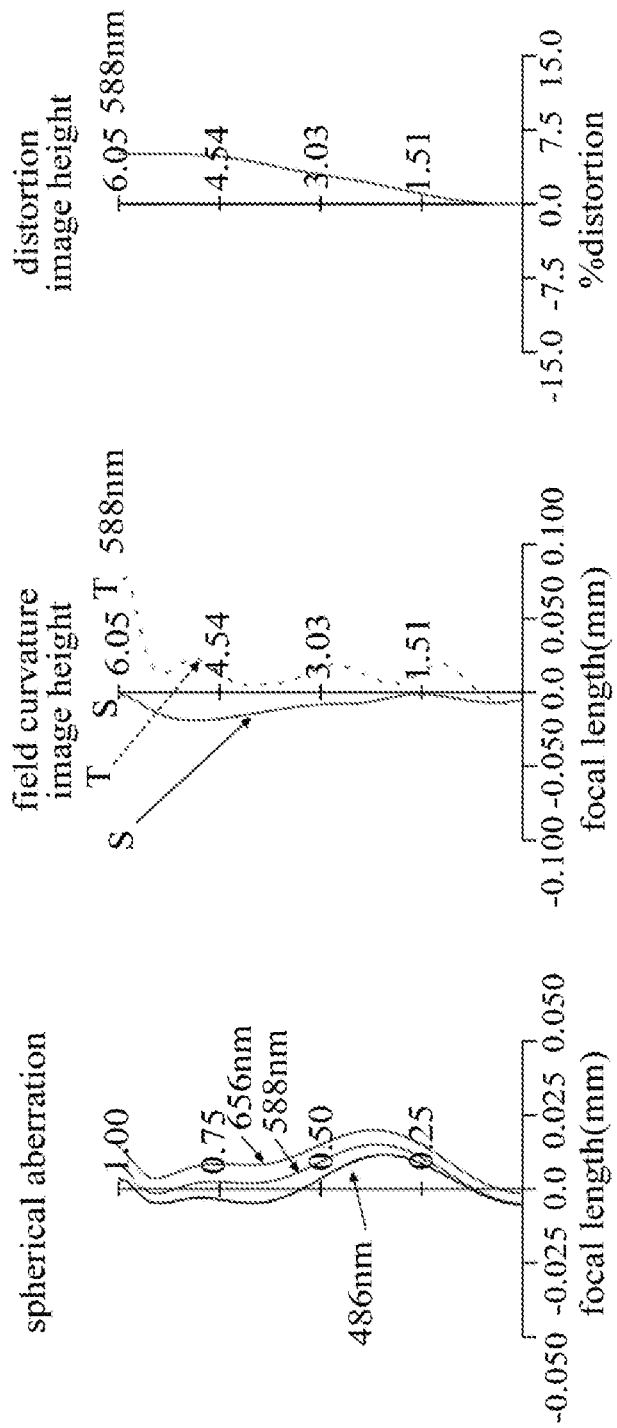
FIG. 2 is diagrams of a spherical aberration, a field curvature, a distortion of the camera lens LA according to the first embodiment of the present invention.

FIG. 2 illustrates a spherical aberration, a field curvature, and a distortion of the camera lens LA according to the first embodiment. In addition, in FIG. 2, S is a field curvature for a sagittal image plane, and T is a field curvature for a meridional image plane, which are the same for the second to fifth embodiments. As shown in FIG. 2, the camera lens LA according to the first embodiment has 2ω=84°, the wide-angle and small height, i.e., TTL/IH=1.28, and good optical properties.

Second Embodiment

Figure 3:
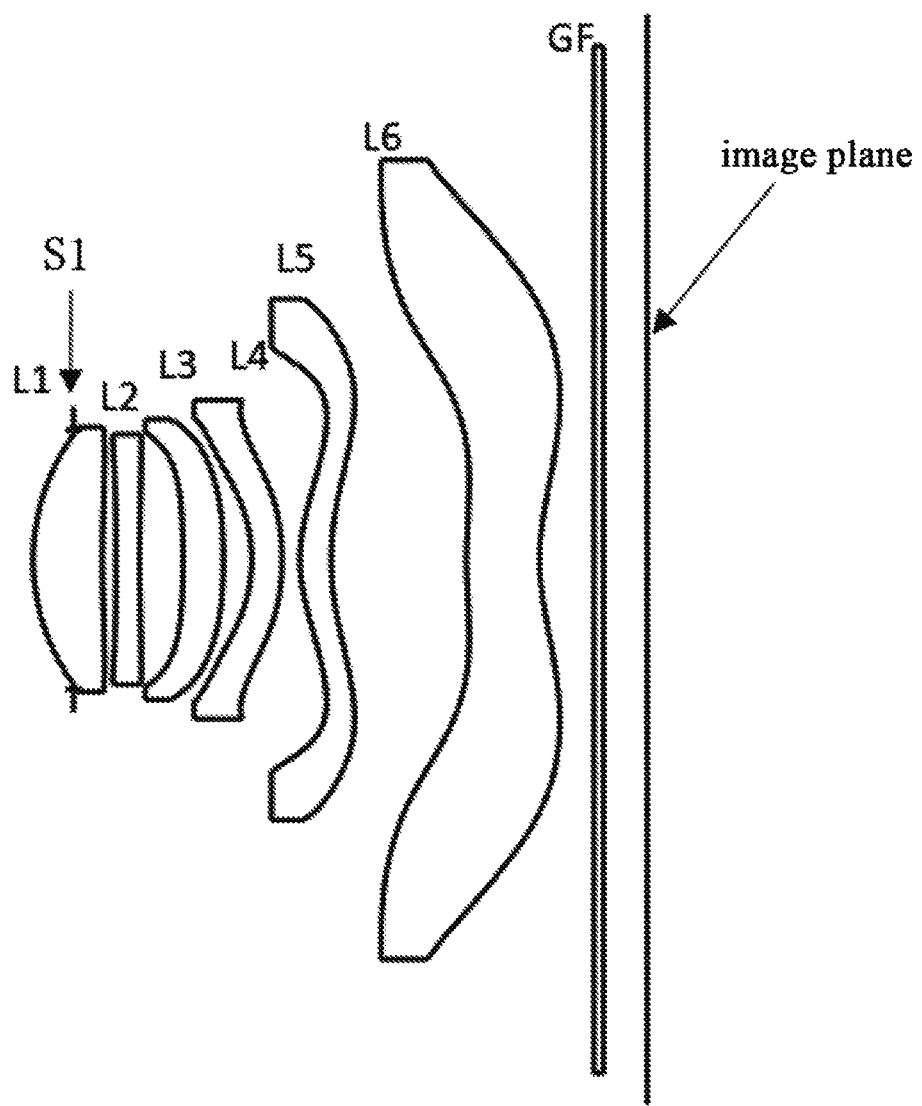
FIG. 3 is a schematic diagram of a camera lens LA according to a second embodiment of the present invention.

FIG. 3 is a schematic diagram of a camera lens LA according to a second embodiment of the present invention. The curvature radiuses R of the image side surfaces and object side surfaces of the first lens L1 to the sixth lens L6 of the camera lens LA according to the second embodiment, the center thicknesses of the lenses, or distances d between the lenses, refractive indexes nd, abbe numbers ν are shown in Table 4; conic coefficients k and aspheric coefficients are shown in Table 5; and 2ω, Fno, f, f1, f2, f3, f4, f5, f6, TTL, and IH are shown in Table 6.

TABLE 4

| | R | d | | nd | | vd | Effective radius(mm) |
|---|---|---|---|---|---|---|---|
| S1 | ∞ | d0= | −0.464 | | | | 1.494 |
| R1 | 2.46398 | d1= | 0.797 | nd1 | 1.5267 | v1 76.60 | 1.527 |
| R2 | 14.67188 | d2= | 0.155 | | | | 1.472 |
| R3 | 252.65854 | d3= | 0.270 | nd2 | 1.6153 | v2 25.94 | 1.443 |
| R4 | 14.03659 | d4= | 0.499 | | | | 1.417 |
| R5 | −13.44574 | d5= | 0.467 | nd3 | 1.5661 | v3 37.71 | 1.465 |
| R6 | −5.48159 | d6= | 0.324 | | | | 1.617 |
| R7 | −1.67489 | d7= | 0.347 | nd4 | 1.6700 | v4 19.39 | 1.645 |
| R8 | −2.98208 | d8= | 0.207 | | | | 1.838 |
| R9 | 1.70915 | d9= | 0.359 | nd5 | 1.5346 | v5 55.69 | 2.457 |
| R10 | 3.08291 | d10= | 1.557 | | | | 3.006 |
| R11 | 6.11934 | d11= | 0.838 | nd6 | 1.5346 | v6 55.69 | 4.225 |
| R12 | 2.59158 | d12= | 0.233 | | | | 4.609 |
| R13 | ∞ | d13= | 0.110 | ndg | 1.5168 | vg 64.17 | 6.255 |
| R14 | ∞ | d14= | 0.892 | | | | 6.255 |

Reference wavelength = 588 nm

TABLE 5

| | Conic coefficient | Aspherical coefficient | | | |
|---|---|---|---|---|---|
| | k | A4 | A6 | A8 | A10 |
| R1  | 1.8323E−02  | 1.8551E−04  | 5.4778E−04  | 1.6250E−05  | −2.6341E−04 |
| R2  | 0.0000E+00  | −1.5584E−02 | 7.4767E−03  | −5.5441E−03 | 4.4623E−03 |
| R3  | 0.0000E+00  | −3.5623E−02 | 2.2097E−02  | −7.3175E−03 | 2.2749E−03 |
| R4  | 0.0000E+00  | −3.0865E−02 | 1.9883E−02  | −9.6409E−03 | 4.9693E−03 |
| R5  | 0.0000E+00  | −3.7964E−02 | −3.1435E−02 | 5.0337E−02  | −6.7419E−02 |
| R6  | 0.0000E+00  | −7.2593E−03 | −1.5609E−01 | 3.5618E−01  | −5.3869E−01 |
| R7  | −1.5789E+00 | 2.9387E−02  | −1.7588E−01 | 3.0754E−01  | −3.3397E−01 |
| R8  | −2.7462E+00 | −1.0667E−01 | 5.3970E−02  | 3.6252E−03  | −1.8117E−02 |
| R9  | −2.1690E+00 | −1.2381E−01 | 9.7957E−02  | −7.1891E−02 | 3.7603E−02 |
| R10 | −7.9489E+00 | 2.6369E−02  | −4.0323E−02 | 2.1177E−02  | −6.4776E−03 |
| R11 | −5.1140E−01 | −6.8180E−02 | 1.7997E−02  | −4.6702E−03 | 8.8305E−04 |
| R12 | −7.3771E+00 | −3.1761E−02 | 8.0753E−03  | −1.7567E−03 | 2.6723E−04 |

| | Aspherical coefficient | | | | |
|---|---|---|---|---|---|
| | A12 | A14 | A16 | A18 | A20 |
| R1  | 1.0329E−05  | 1.1102E−04  | −5.0079E−05 | 0.0000E+00  | 0.0000E+00 |
| R2  | −2.7652E−03 | 7.3029E−04  | −5.8342E−05 | 0.0000E+00  | 0.0000E+00 |
| R3  | −1.3472E−03 | 4.7045E−04  | −1.4659E−05 | 0.0000E+00  | 0.0000E+00 |
| R4  | −3.2144E−03 | 1.2008E−03  | −1.5766E−04 | 0.0000E+00  | 0.0000E+00 |
| R5  | 5.7320E−02  | −2.7896E−02 | 4.8578E−03  | 9.6992E−04  | −3.5477E−04 |
| R6  | 5.3677E−01  | −3.3107E−01 | 1.1971E−01  | −2.3203E−02 | 1.8591E−03 |
| R7  | 2.8490E−01  | −1.6923E−01 | 6.0750E−02  | −1.1639E−02 | 9.0854E−04 |
| R8  | 1.8050E−02  | −1.1008E−02 | 3.7930E−03  | −6.7047E−04 | 4.7504E−05 |
| R9  | −1.3126E−02 | 2.9278E−03  | −3.9949E−04 | 3.0159E−05  | −9.5261E−07 |
| R10 | 1.1810E−03  | −1.2801E−04 | 7.8493E−06  | −2.3221E−07 | 1.8360E−09 |
| R11 | −1.0390E−04 | 7.4963E−06  | −3.2508E−07 | 7.8131E−09  | −8.0250E−11 |
| R12 | −2.7759E−05 | 1.9026E−06  | −8.1047E−08 | 1.9272E−09  | −1.9453E−11 |

TABLE 6

| | |
|---|---|
| 2ω (°)    | 82.56   |
| Fno       | 2.00    |
| f (mm)    | 5.975   |
| f1 (mm)   | 5.512   |
| f2 (mm)   | −24.166 |
| f3 (mm)   | 16.008  |
| f4 (mm)   | −6.382  |
| f5 (mm)   | 6.576   |
| f6 (mm)   | −9.168  |
| TTL (mm)  | 7.053   |
| LB (mm)   | 1.003   |
| IH (mm)   | 6.050   |

As shown in Table 16, the second embodiment satisfies the conditions (1) to (6).

Figure 4:
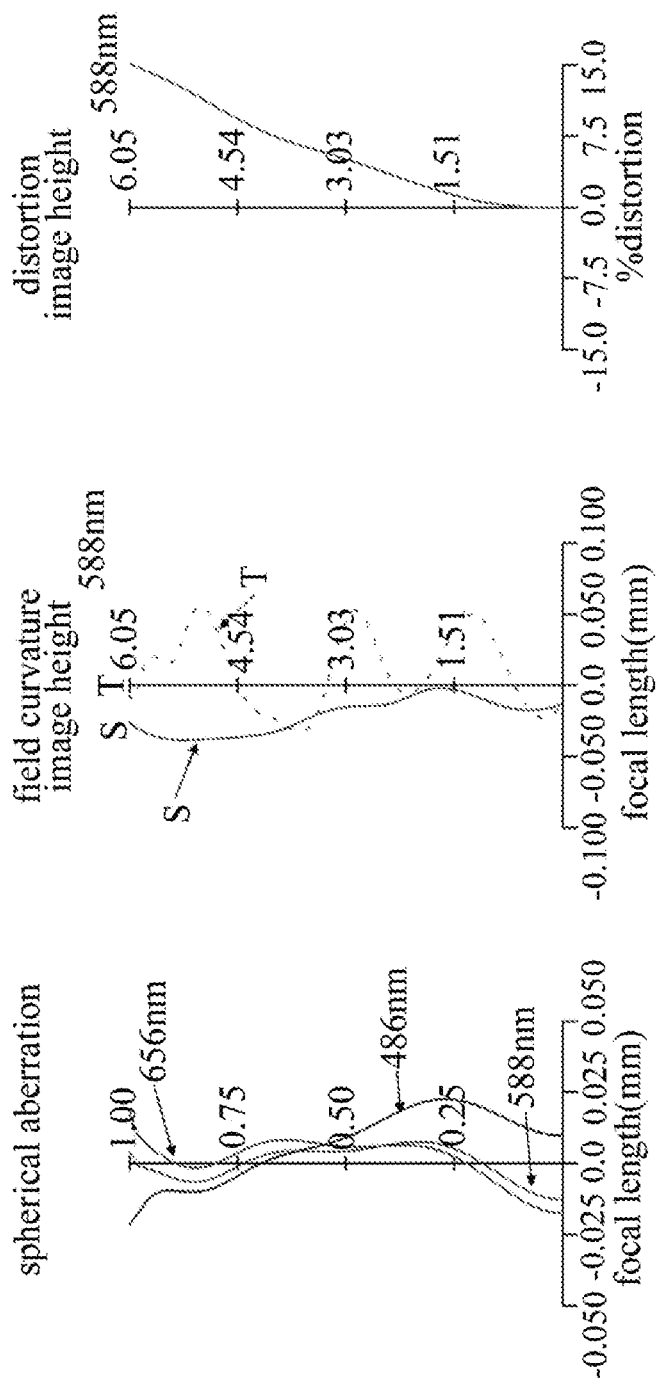
FIG. 4 is diagrams of a spherical aberration, a field curvature, a distortion of the camera lens LA according to the second embodiment of the present invention.

FIG. 4 illustrates a spherical aberration, a field curvature, and a distortion of the camera lens LA according to the second embodiment. As shown in FIG. 4, the camera lens LA according to the second embodiment has 2ω=83°, the wide-angle and small height, i.e., TTL/IH=1.17, and good optical properties.

Third Embodiment

Figure 5:
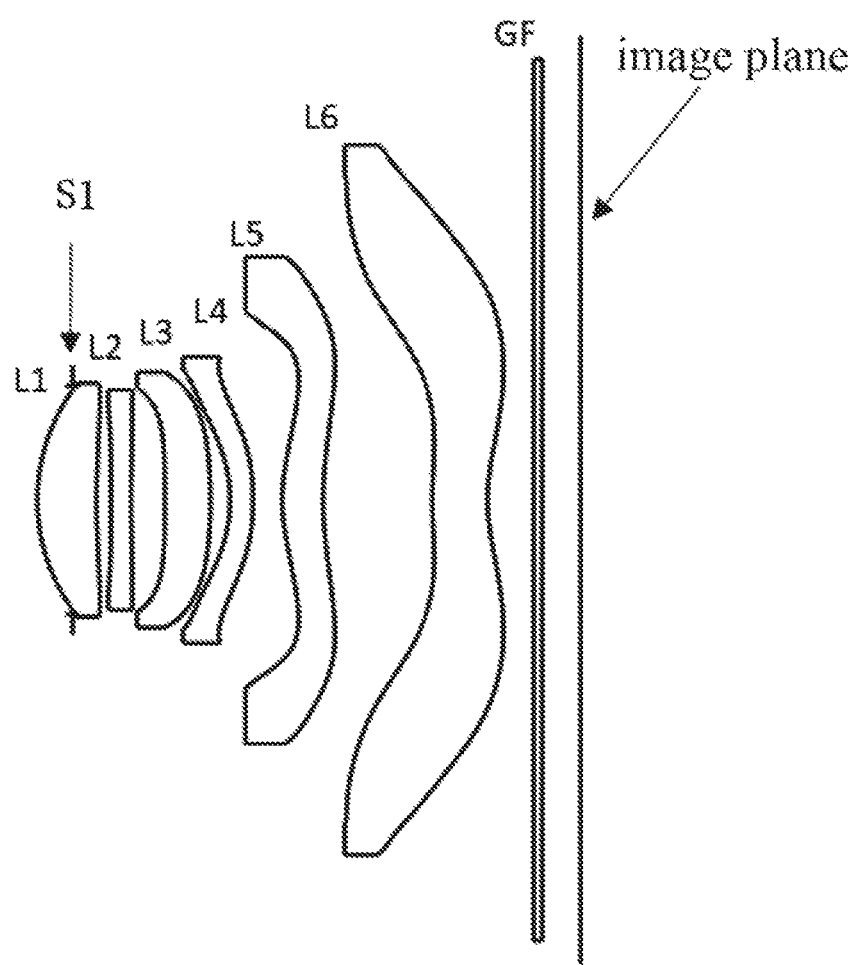
FIG. 5 is a schematic diagram of a camera lens LA according to a third embodiment of the present invention.

FIG. 5 is a schematic diagram of a camera lens LA according to a third embodiment of the present invention. The curvature radiuses R of the image side surfaces and object side surfaces of the first lens L1 to the sixth lens L6 of the camera lens LA according to the third embodiment, the center thicknesses of the lenses, or distances d between the lenses, refractive indexes nd, abbe numbers v are shown in Table 7; conic coefficients k and aspheric coefficients are shown in Table 8; and 2ω, Fno, f, f1, f2, f3, f4, f5, f6, TTL, and IH are shown in Table 9.

TABLE 7

| | R | d | nd | | vd | Effective radius(mm) |
|---|---|---|---|---|---|---|
| S1  | ∞         | d0= −0.461 |            |     |       | 1.494 |
| R1  | 2.48261   | d1= 0.771  | nd1 1.5266 | v1  | 76.49 | 1.527 |
| R2  | 10.71513  | d2= 0.188  |            |     |       | 1.468 |
| R3  | 218.45680 | d3= 0.270  | nd2 1.5972 | v2  | 28.31 | 1.438 |
| R4  | 15.06639  | d4= 0.440  |            |     |       | 1.413 |
| R5  | −40.85054 | d5= 0.595  | nd3 1.5552 | v3  | 46.49 | 1.469 |
| R6  | −6.69213  | d6= 0.255  |            |     |       | 1.670 |
| R7  | −2.04443  | d7= 0.300  | nd4 1.6713 | v4  | 19.24 | 1.701 |
| R8  | −3.82308  | d8= 0.378  |            |     |       | 1.870 |

TABLE 7-continued

|  | R | d |  | nd |  | vd | Effective radius(mm) |
|---|---|---|---|---|---|---|---|
| R9 | 2.08324 | d9= | 0.533 | nd5 | 1.5829 v5 | 33.50 | 2.455 |
| R10 | 4.02706 | d10= | 1.434 |  |  |  | 3.193 |
| R11 | 5.78276 | d11= | 0.717 | nd6 | 1.5880 v6 | 39.26 | 4.274 |
| R12 | 2.35004 | d12= | 0.604 |  |  |  | 4.639 |
| R13 | ∞ | d13= | 0.110 | ndg | 1.5168 vg | 64.17 | 6.255 |
| R14 | ∞ | d14= | 0.500 |  |  |  | 6.255 |

Reference wavelength = 588 nm

TABLE 8

| | Conic coefficient | Aspherical coefficient | | | |
|---|---|---|---|---|---|
| | k | A4 | A6 | A8 | A10 |
| R1 | 4.1175E−02 | −2.4901E−05 | 5.9601E−04 | 5.1048E−04 | −9.3516E−04 |
| R2 | 0.0000E+00 | −1.3672E−02 | 3.3173E−03 | −2.4953E−03 | 2.4890E−03 |
| R3 | 0.0000E+00 | −3.6099E−02 | 1.8323E−02 | −4.5684E−03 | 1.0335E−03 |
| R4 | 0.0000E+00 | −3.0158E−02 | 1.1906E−02 | 4.2439E−03 | −9.8518E−03 |
| R5 | 0.0000E+00 | −2.8289E−02 | −3.0672E−02 | 6.1805E−02 | −1.3089E−01 |
| R6 | 0.0000E+00 | −2.9747E−02 | 2.1382E−02 | −4.8063E−02 | 4.5408E−02 |
| R7 | −1.2855E+00 | −1.1453E−01 | 2.7937E−01 | −4.1195E−01 | 4.1739E−01 |
| R8 | −1.0050E+00 | −2.0750E−01 | 3.3189E−01 | −3.6840E−01 | 2.9062E−01 |
| R9 | −2.0087E+00 | −1.6296E−01 | 1.5293E−01 | −1.1248E−01 | 5.8135E−02 |
| R10 | −1.8355E+01 | −3.0096E−02 | 2.2569E−02 | −1.1612E−02 | 3.6236E−03 |
| R11 | −4.0502E−01 | −9.4513E−02 | 2.7267E−02 | −6.6235E−03 | 1.1815E−03 |
| R12 | −7.4550E+00 | −4.2461E−02 | 1.1985E−02 | −2.6339E−03 | 3.9723E−04 |

| | Aspherical coefficient | | | | |
|---|---|---|---|---|---|
| | A12 | A14 | A16 | A18 | A20 |
| R1 | 4.5107E−04 | −5.1650E−05 | −2.6875E−05 | 0.0000E+00 | 0.0000E+00 |
| R2 | −1.9123E−03 | 5.5576E−04 | −4.6565E−05 | 0.0000E+00 | 0.0000E+00 |
| R3 | −4.9517E−04 | 1.6081E−04 | 2.9082E−05 | 0.0000E+00 | 0.0000E+00 |
| R4 | 6.6780E−03 | −2.1665E−03 | 3.0464E−04 | 0.0000E+00 | 0.0000E+00 |
| R5 | 1.8903E−01 | −1.3682E−01 | 6.6152E−02 | −1.7289E−02 | 1.8601E−03 |
| R6 | −2.6301E−02 | 9.2370E−03 | −1.6297E−03 | 2.2097E−05 | 2.1780E−05 |
| R7 | −2.8094E−01 | 1.2465E−01 | −3.5112E−02 | 5.8696E−03 | −3.9874E−04 |
| R8 | −1.5441E−01 | 5.3989E−02 | −1.1889E−02 | 1.4903E−03 | −8.0795E−05 |
| R9 | −2.0857E−02 | 5.0054E−03 | −7.6199E−04 | 6.5987E−05 | −2.4527E−08 |
| R10 | −7.5353E−04 | 1.0303E−04 | −8.7439E−08 | 4.1505E−07 | −8.4292E−09 |
| R11 | −1.3649E−04 | 9.8836E−06 | −4.3456E−07 | 1.0638E−08 | −1.1151E−10 |
| R12 | −4.0878E−05 | 2.8039E−06 | −1.2103E−07 | 2.9432E−09 | −3.0549E−11 |

TABLE 9

| | |
|---|---|
| 2ω (°) | 85.18 |
| Fno | 2.00 |
| f (mm) | 5.975 |
| f1 (mm) | 5.944 |
| f2 (mm) | −27.109 |
| f3 (mm) | 14.327 |
| f4 (mm) | −7.022 |
| f5 (mm) | 6.725 |
| f6 (mm) | −7.540 |
| TTL (mm) | 7.095 |
| LB (mm) | 1.004 |
| IH (mm) | 6.050 |

As shown in Table 16, the third embodiment satisfies the conditions (1) to (6).

Figure 6:
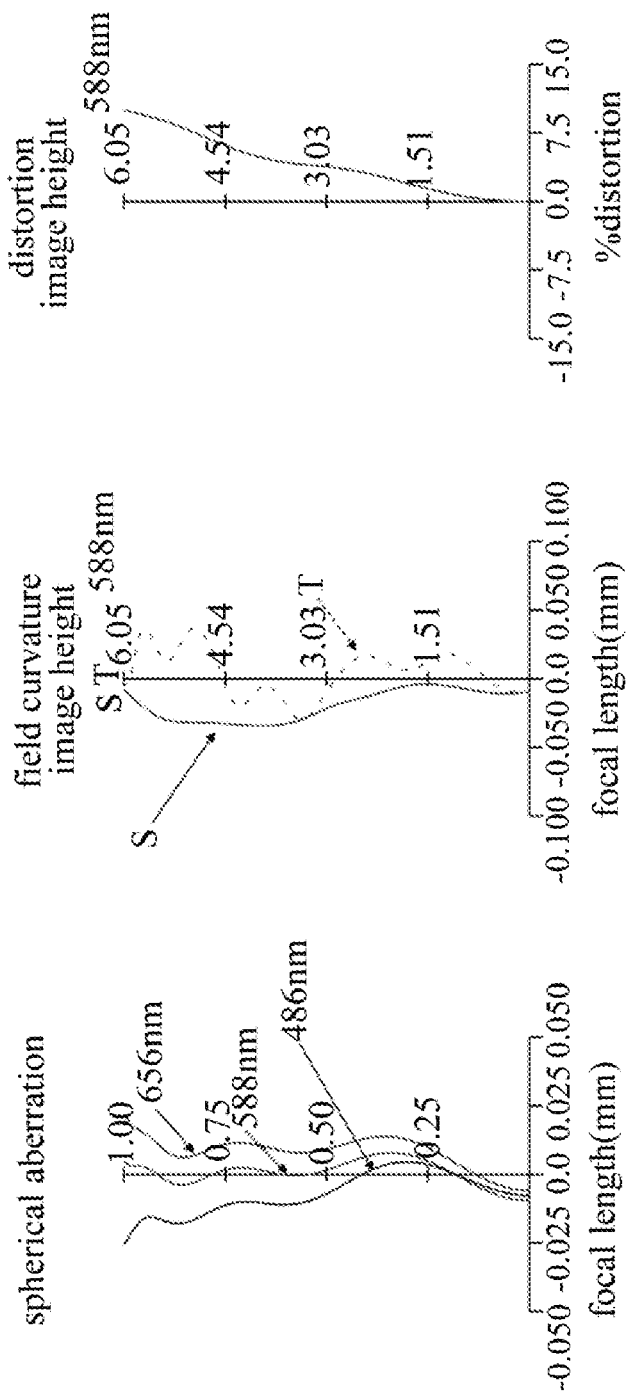
FIG. 6 is diagrams of a spherical aberration, a field curvature, a distortion of the camera lens LA according to the third embodiment of the present invention.

FIG. 6 illustrates a spherical aberration, a field curvature, and a distortion of the camera lens LA according to the third embodiment. As shown in FIG. 6, the camera lens LA according to the second embodiment has 2ω=85°, the wide-angle and small height, i.e., TTL/IH=1.17, and good optical properties.

Fourth Embodiment

Figure 7:
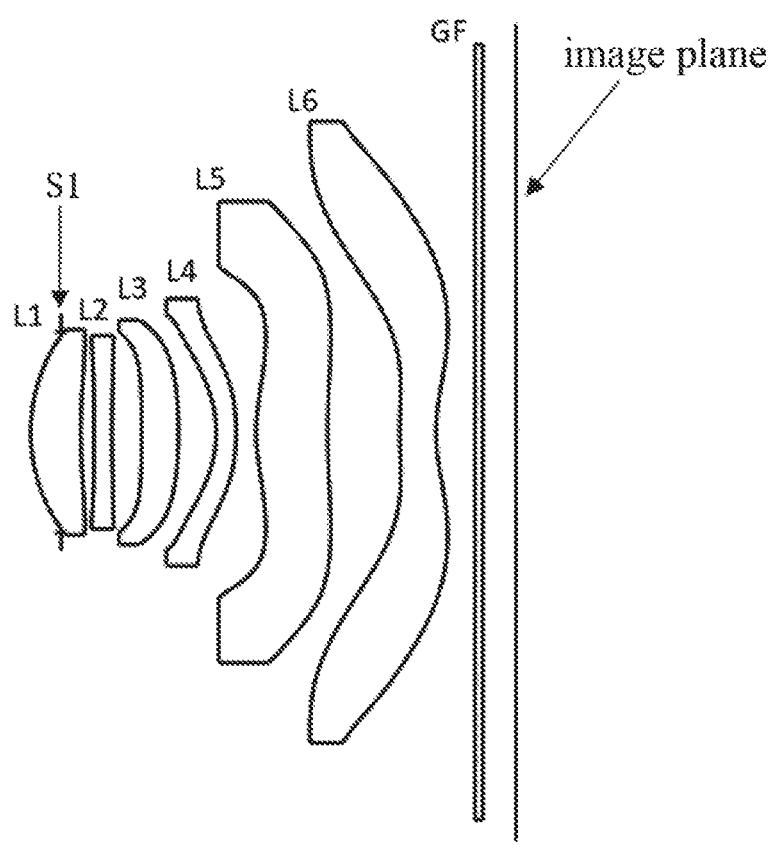
FIG. 7 is a schematic diagram of a camera lens LA according to a fourth embodiment of the present invention.

FIG. 7 is a schematic diagram of a camera lens LA according to a fourth embodiment of the present invention. The curvature radiuses R of the image side surfaces and object side surfaces of the first lens L1 to the sixth lens L6 of the camera lens LA according to the fourth embodiment, the center thicknesses of the lenses, or distances d between the lenses, refractive indexes nd, abbe numbers v are shown in Table 10; conic coefficients k and aspheric coefficients are shown in Table 11; and 2ω, Fno, f, f1, f2, f3, f4, f5, f6, TTL, and IH are shown in Table 12.

TABLE 10

| | R | d | | nd | vd | Effective radius(mm) |
|---|---|---|---|---|---|---|
| S1 | ∞ | d0= | −0.455 | | | 1.494 |
| R1 | 2.53138 | d1= | 0.747 | nd1 1.5296 | v1 70.97 | 1.528 |
| R2 | 8.92981 | d2= | 0.196 | | | 1.467 |
| R3 | 83.24802 | d3= | 0.270 | nd2 1.6425 | v2 22.02 | 1.441 |
| R4 | 15.79621 | d4= | 0.437 | | | 1.427 |
| R5 | −65.38596 | d5= | 0.550 | nd3 1.5439 | v3 55.95 | 1.495 |
| R6 | −6.55271 | d6= | 0.561 | | | 1.671 |
| R7 | −1.82533 | d7= | 0.300 | nd4 1.6701 | v4 19.33 | 1.758 |
| R8 | −3.37304 | d8= | 0.297 | | | 1.990 |
| R9 | 2.57163 | d9= | 1.062 | nd5 1.5714 | v5 37.75 | 2.467 |
| R10 | 10.41596 | d10= | 1.077 | | | 3.435 |
| R11 | 7.13929 | d11= | 0.539 | nd6 1.5646 | v6 40.92 | 4.279 |
| R12 | 2.37830 | d12= | 0.584 | | | 4.628 |
| R13 | ∞ | d13= | 0.110 | ndg 1.5168 | vg 64.17 | 6.255 |
| R14 | ∞ | d14= | 0.500 | | | 6.255 |

Reference wavelength = 588 nm

TABLE 11

| | Conic coefficient | Aspherical coefficient | | | |
|---|---|---|---|---|---|
| | k | A4 | A6 | A8 | A10 |
| R1 | 4.2873E−02 | −9.9271E−04 | 4.6804E−03 | −6.7146E−03 | 6.3650E−03 |
| R2 | 0.0000E+00 | −1.3079E−02 | 3.5471E−03 | −6.2006E−03 | 8.3248E−03 |
| R3 | 0.0000E+00 | −3.5760E−02 | 1.6801E−02 | −1.0340E−02 | 1.2214E−02 |
| R4 | 0.0000E+00 | −2.7996E−02 | 1.18545E−02 | 3.1445E−04 | −2.7325E−03 |
| R5 | 0.0000E+00 | −2.0592E−02 | −5.5913E−02 | 1.4764E−01 | −2.7993E−01 |
| R6 | 0.0000E+00 | −8.1540E−03 | −5.8815E−02 | 1.2534E−01 | −1.8195E−01 |
| R7 | −1.4096E+00 | −1.5533E−02 | −6.9390E−04 | 5.5500E−03 | 2.4088E−02 |
| R8 | −1.1189E+00 | −1.1518E−01 | 8.5342E−02 | −3.8104E−02 | 1.2197E−02 |
| R9 | −2.3053E+00 | −1.1706E−01 | 7.5531E−02 | −4.5797E−02 | 2.2159E−02 |
| R10 | −2.0209E+01 | −2.6351E−03 | −1.1584E−02 | 7.3405E−03 | −2.4646E−03 |
| R11 | 1.5681E−01 | −9.4018E−02 | 2.4480E−02 | −4.6052E−03 | 6.5145E−04 |
| R12 | −7.8336E+00 | −4.9099E−02 | 1.3057E−02 | −2.5097E−03 | 3.2533E−04 |

| | Aspherical coefficient | | | | |
|---|---|---|---|---|---|
| | A12 | A14 | A16 | A18 | A20 |
| R1 | −3.6802E−03 | 1.1704E−03 | −1.7137E−04 | 0.0000E+00 | 0.0000E+00 |
| R2 | −6.2086E−03 | 2.1591E−03 | −2.9253E−04 | 0.0000E+00 | 0.0000E+00 |
| R3 | −9.2859E−03 | 3.4755E−03 | −4.7513E−04 | 0.0000E+00 | 0.0000E+00 |
| R4 | 1.6522E−03 | −5.6426E−04 | 1.2668E−04 | 0.0000E+00 | 0.0000E+00 |
| R5 | 3.2467E−01 | −2.3591E−01 | 1.0358E−01 | −2.5049E−02 | 2.5574E−03 |
| R6 | 1.6422E−01 | −9.3297E−02 | 3.2244E−02 | −6.1622E−03 | 4.9656E−04 |
| R7 | −3.8040E−02 | 2.5872E−02 | −9.5841E−03 | 1.8886E−03 | −1.5635E−04 |
| R8 | −7.6085E−04 | −1.2891E−03 | 5.7609E−04 | −1.0566E−04 | 7.4727E−06 |

TABLE 11-continued

| | | | | |
|---|---|---|---|---|
| R9 | −7.9198E−03 | 1.9108E−03 | −2.8877E−04 | 2.4307E−05 | −8.5703E−07 |
| R10 | 4.9418E−04 | −6.1350E−05 | 4.6060E−06 | −1.9053E−07 | 3.3173E−09 |
| R11 | −6.4850E−05 | 4.2994E−06 | −1.7924E−07 | 4.2403E−09 | −4.3394E−11 |
| R12 | −2.8509E−05 | 1.6904E−06 | −6.5290E−08 | 1.4758E−09 | −1.4678E−11 |

TABLE 12

| | |
|---|---|
| 2ω (°) | 86.12 |
| Fno | 2.00 |
| f (mm) | 5.978 |
| f1 (mm) | 6.412 |
| f2 (mm) | −32.844 |
| f3 (mm) | 13.345 |
| f4 (mm) | −6.437 |
| f5 (mm) | 5.696 |
| f6 (mm) | −6.586 |
| TTL (mm) | 7.230 |
| LB (mm) | 1.019 |
| IH (mm) | 6.050 |

As shown in Table 16, the fourth embodiment satisfies the conditions (1) to (6).

Figure 8:
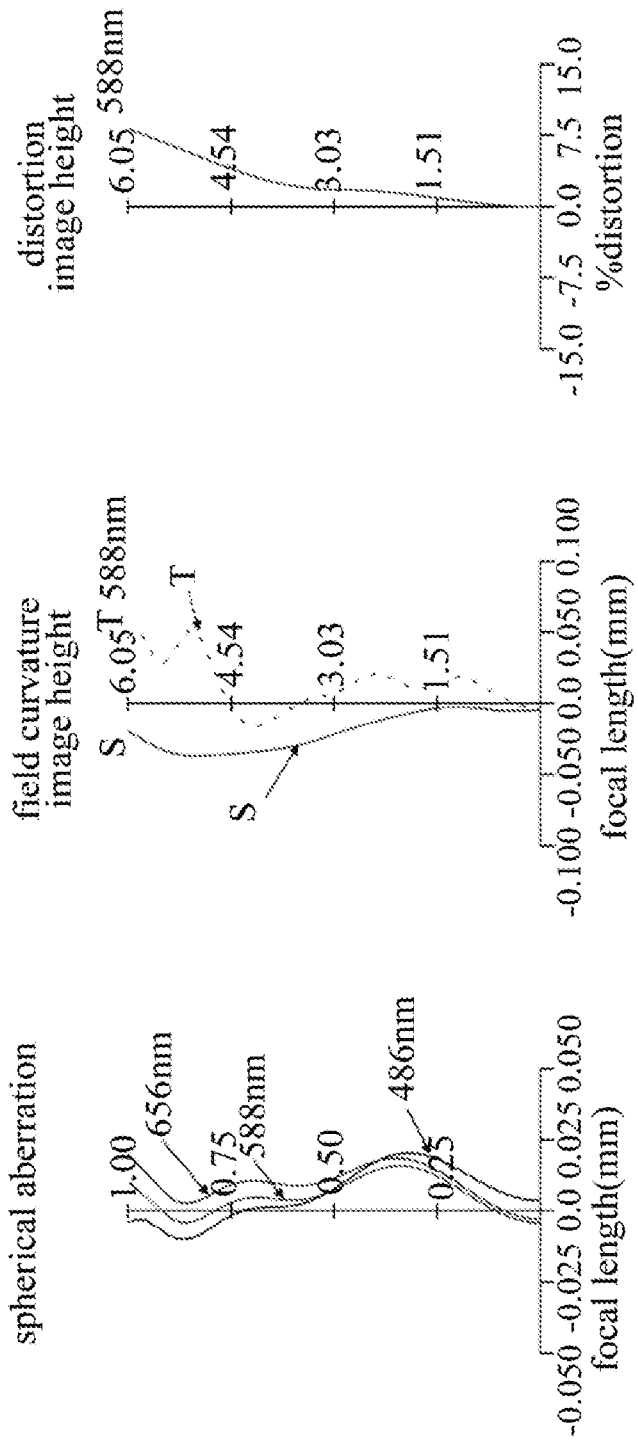
FIG. 8 is diagrams of a spherical aberration, a field curvature, a distortion of the camera lens LA according to the fourth embodiment of the present invention.

FIG. 8 illustrates a spherical aberration, a field curvature, and a distortion of the camera lens LA according to the fourth embodiment. As shown in FIG. 8, the camera lens LA according to the second embodiment has 2ω=86°, the wide-angle and small height, i.e., TTL/IH=1.20, and good optical properties.

Fifth Embodiment

Figure 9:
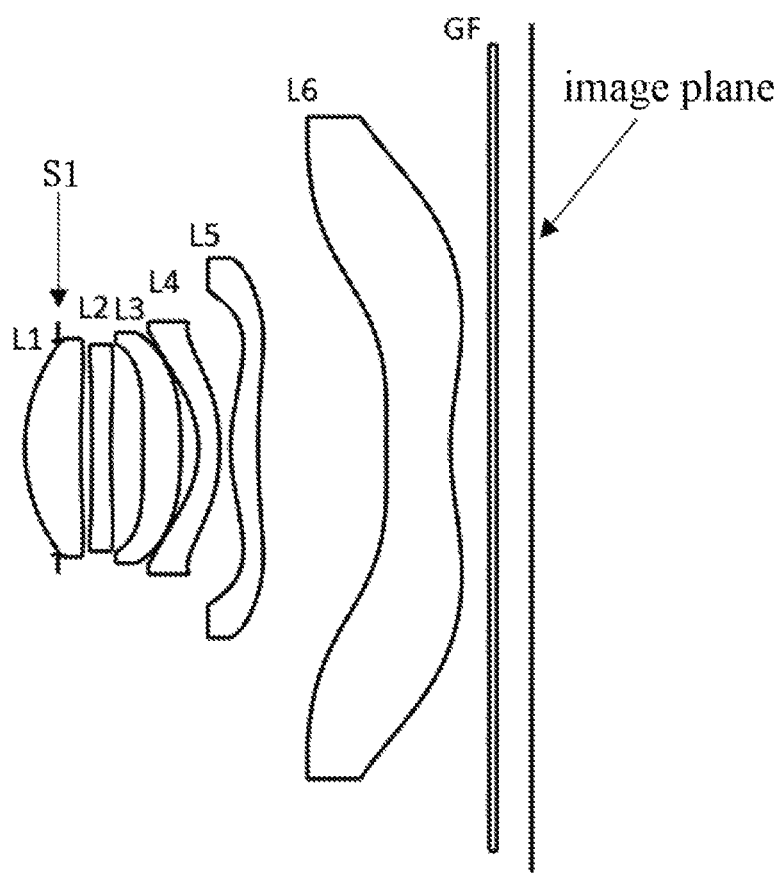
FIG. 9 is a schematic diagram of a camera lens LA according to a fifth embodiment of the present invention.

FIG. 9 is a schematic diagram of a camera lens LA according to a fifth embodiment of the present invention. The curvature radiuses R of the image side surfaces and object side surfaces of the first lens L1 to the sixth lens L6 of the camera lens LA according to the fifth embodiment, the center thicknesses of the lenses, or distances d between the lenses, refractive indexes nd, abbe numbers v are shown in Table 13; conic coefficients k and aspheric coefficients are shown in Table 14; and 2ω, Fno, f, f1, f2, f3, f4, f5, f6, TTL, and IH are shown in Table 15.

TABLE 13

| | R | d | | nd | vd | Effective radius(mm) |
|---|---|---|---|---|---|---|
| S1 | ∞ | d0= | −0.472 | | | 1.532 |
| R1 | 2.53027 | d1= | 0.800 | nd1 | 1.5266 v1 | 76.49 | 1.565 |
| R2 | 15.43469 | d2= | 0.159 | | | 1.510 |
| R3 | 286.22765 | d3= | 0.270 | nd2 | 1.5532 v2 | 42.92 | 1.484 |
| R4 | 11.46058 | d4= | 0.463 | | | 1.456 |
| R5 | −41.60341 | d5= | 0.544 | nd3 | 1.5895 v3 | 31.53 | 1.500 |
| R6 | −5.64023 | d6= | 0.249 | | | 1.656 |
| R7 | −1.45475 | d7= | 0.300 | nd4 | 1.6713 v4 | 19.24 | 1.667 |
| R8 | −3.63223 | d8= | 0.158 | | | 1.813 |
| R9 | 2.23261 | d9= | 0.400 | nd5 | 1.5945 v5 | 30.21 | 2.259 |
| R10 | 21.18525 | d10= | 1.837 | | | 2.723 |
| R11 | 57.81157 | d11= | 0.918 | nd6 | 1.5717 v6 | 37.63 | 4.223 |
| R12 | 3.93939 | d12= | 0.553 | | | 4.751 |
| R13 | ∞ | d13= | 0.110 | ndg | 1.5168 vg | 64.17 | 6.255 |
| R14 | ∞ | d14= | 0.500 | | | 6.255 |

Reference wavelength = 588 nm

TABLE 14

| | Conic coefficient | Aspherical coefficient | | | |
|---|---|---|---|---|---|
| | k | A4 | A6 | A8 | A10 |
| R1 | 1.3336E−02 | 1.2129E−03 | −3.2744E−03 | 6.8894E−03 | −7.1288E−03 |
| R2 | 0.0000E+00 | −9.8416E−03 | 1.7237E−03 | 2.8350E−03 | −5.1596E−03 |
| R3 | 0.0000E+00 | −2.5600E−02 | 1.5240E−02 | −5.4618E−03 | −5.1161E−05 |
| R4 | 0.0000E+00 | −2.4314E−02 | 1.1241E−02 | −7.3059E−03 | 3.2763E−03 |
| R5 | 0.0000E+00 | −2.5442E−02 | −3.8404E−02 | 7.9617E−02 | −1.5274E−01 |
| R6 | 0.0000E+00 | −3.4577E−02 | −8.9619E−02 | 1.0505E−01 | −7.4342E−02 |
| R7 | −1.5833E+00 | 4.7099E−02 | −1.7631E−01 | 2.6215E−01 | −1.9552E−01 |
| R8 | −1.1090E+00 | −1.2164E−01 | 5.5585E−02 | 4.3630E−02 | −6.8068E−02 |
| R9 | −1.9997E+00 | −1.3389E−01 | 9.9263E−02 | −6.9477E−02 | 3.8892E−02 |
| R10 | 4.4688E+01 | 5.6271E−02 | −7.3074E−02 | 4.7819E−02 | −1.9232E−02 |
| R11 | 4.9980E+01 | −3.7794E−02 | 6.2571E−03 | −1.0865E−03 | 1.9124E−04 |
| R12 | −1.0907E+01 | −1.9967E−02 | 3.2544E−03 | −4.8575E−04 | 5.3302E−05 |
| | Aspherical coefficient | | | | |
| | A12 | A14 | A16 | A18 | A20 |
| R1 | 3.8582E−03 | −1.0465E−03 | 9.6773E−05 | 0.0000E+00 | 0.0000E+00 |
| R2 | 3.5033E−03 | −1.3473E−03 | 2.1921E−04 | 0.0000E+00 | 0.0000E+00 |

TABLE 14-continued

| R3  | 1.1655E−03  | −6.3148E−04 | 1.5634E−04  | 0.0000E+00  | 0.0000E+00  |
|-----|-------------|-------------|-------------|-------------|-------------|
| R4  | −1.8672E−03 | 8.3636E−04  | −1.4118E−04 | 0.0000E+00  | 0.0000E+00  |
| R5  | 1.8444E−01  | −1.4231E−01 | 6.6547E−02  | −1.6952E−02 | 1.7806E−03  |
| R6  | 1.9667E−02  | 1.1654E−02  | −1.0685E−02 | 3.0290E−03  | −3.0270E−04 |
| R7  | 7.3395E−02  | −3.3773E−03 | −8.1251E−03 | 2.8603E−03  | −3.1138E−04 |
| R8  | 4.4880E−02  | −1.8629E−02 | 4.9390E−02  | −7.4696E−04 | 4.8625E−05  |
| R9  | −1.5805E−02 | 4.2156E−03  | −6.9227E−04 | 6.3262E−05  | −2.4498E−06 |
| R10 | 4.7380E−03  | −7.1618E−04 | 6.4559E−05  | −3.1554E−06 | 6.2910E−08  |
| R11 | −2.2009E−05 | 1.5158E−06  | −6.1155E−08 | 1.3384E−09  | −1.2284E−11 |
| R12 | −4.2042E−06 | 2.3195E−07  | −8.3638E−09 | 1.7500E−10  | −1.5998E−12 |

TABLE 15

| 2ω (°) | 83.16 |
|---|---|
| Fno | 2.00 |
| f (mm) | 6.127 |
| f1 (mm) | 5.627 |
| f2 (mm) | −21.590 |
| f3 (mm) | 11.007 |
| f4 (mm) | −3.827 |
| f5 (mm) | 4.165 |
| f6 (mm) | −7.441 |
| TTL (mm) | 7.261 |
| LB (mm) | 1.001 |
| IH (mm) | 6.050 |

As shown in Table 16, the fifth embodiment satisfies the conditions (1) to (6).

Figure 10:
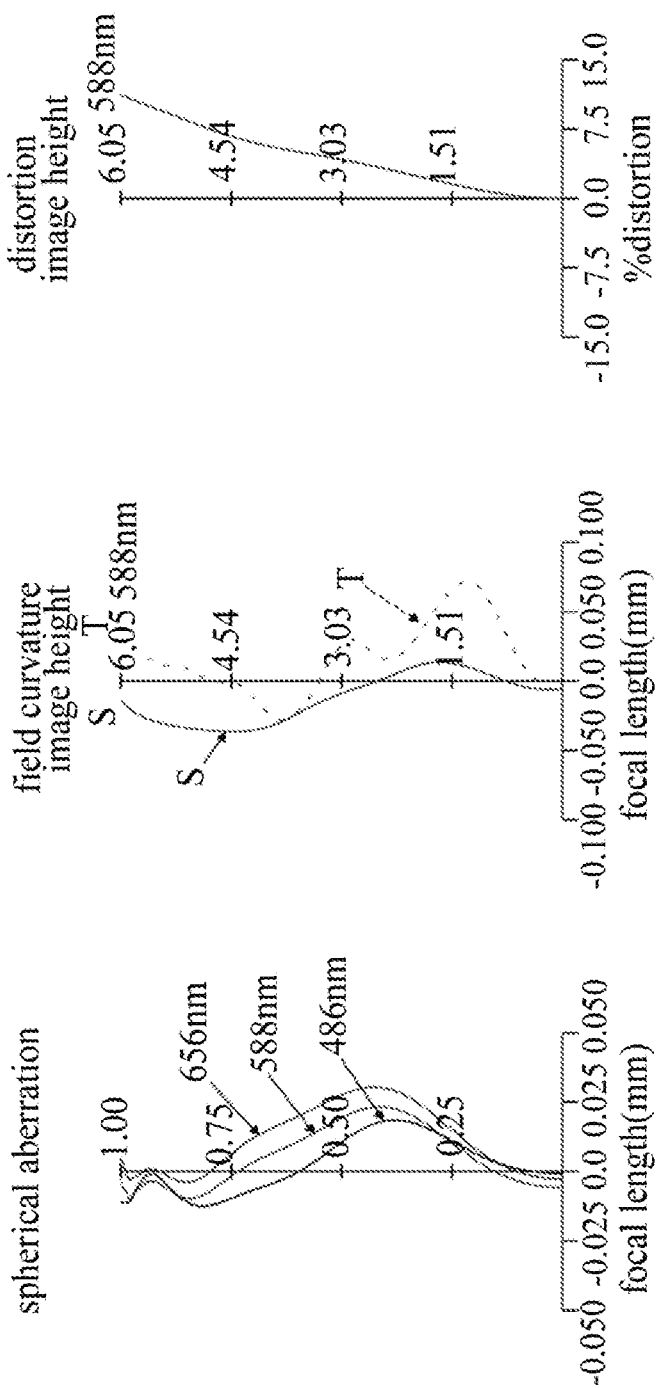
FIG. 10 is diagrams of a spherical aberration, a field curvature, a distortion of the camera lens LA according to the fifth embodiment of the present invention.

FIG. 10 illustrates a spherical aberration, a field curvature, and a distortion of the camera lens LA according to the fifth embodiment. As shown in FIG. 10, the camera lens LA according to the second embodiment has 2ω=83°, the wide-angle and small height, i.e., TTL/IH=1.20, and good optical properties.

Table 16 shows the values of the parameter defined in the conditions (1) to (6) of the first to fifth embodiments.

TABLE 16

|       | Embodiment1 | Embodiment2 | Embodiment3 | Embodiment4 | Embodiment5 | Note |
|-------|-------------|-------------|-------------|-------------|-------------|------|
| DMI   | 5.002%      | 14.977%     | 9.880%      | 8.100%      | 11.126%     | condition (1) |
| f2/f  | −5.034      | −4.045      | −4.537      | −5.494      | −3.524      | condition (2) |
| d10/f | 0.199       | 0.261       | 0.240       | 0.180       | 0.300       | condition (3) |
| d11/f | 0.103       | 0.140       | 0.120       | 0.090       | 0.150       | condition (4) |
| R3/R4 | 7.999       | 18.000      | 14.500      | 4.004       | 24.975      | condition (5) |
| v1-v3 | 38.896      | 38.896      | 30.000      | 15.020      | 44.956      | condition (6) |

What is claimed is:

1. A camera lens, comprising, from an object side:
  a first lens having a positive refractive power;
  a second lens having a negative refractive power;
  a third lens having a positive refractive power;
  a fourth lens having a negative refractive power;
  a fifth lens having a positive refractive power; and
  a sixth lens having a negative refractive power,
  wherein the camera lens satisfies the following conditions:

$5.00 \leq DMI \leq 15.00$;

$-5.50 \leq f2/f \leq -3.50$;

$0.18 \leq d10/f \leq 0.30$; and $0.09 \leq d11/f \leq 0.15$, $4.00 \leq R3/R4 \leq 25.00$, where
  DMI denotes a distortion at a maximum image height;
  f denotes a focal length of the camera lens;
  f2 denotes a focal length of the second lens;
  d10 denotes an on-axis distance from an image side surface of the fifth lens to an object side surface of the sixth lens; and
  d11 denotes a center thickness of the sixth lens;
  R3 denotes a curvature radius of an object side surface of the second lens; and
  R4 denotes a curvature radius of an image side surface of the second lens.

2. The camera lens as described in claim 1, further satisfying the following condition:

$15.00 \leq v1-v3 \leq 45.00$, where
  v1 denotes an abbe number of the first lens; and
  v3 denotes an abbe number of the third lens.

* * * * *